United States Patent [19]
Ueda et al.

[11] Patent Number: 5,748,237
[45] Date of Patent: May 5, 1998

[54] BACKLIGHTING AND COLOR CONTROL ARRANGEMENT FOR LCD TYPE VIDEO CAMERA VIEWFINDER HAVING MULTIPLE BACKLIGHTING SOURCES

[75] Inventors: Toshiaki Ueda, Saitama; Katsuhiko Ueno, Kanagawa; Yoshihiro Ono, Saitama; Toshio Koyama, Kanagawa, all of Japan

[73] Assignee: Sony Corporation, Tokyo, Japan

[21] Appl. No.: 796,384

[22] Filed: Feb. 4, 1997

Related U.S. Application Data

[63] Continuation of Ser. No. 355,183, Dec. 8, 1994, abandoned.

[30] Foreign Application Priority Data

Dec. 20, 1993 [JP] Japan ..................... 5-320040

[51] Int. Cl.$^6$ .................... H04N 5/222; H04N 9/64
[52] U.S. Cl. .................... 348/333; 348/224; 348/227; 345/102; 349/68; 362/8; 396/374
[58] Field of Search .................... 345/102, 109; 348/207, 223, 224, 227, 333, 334, 335; 396/373, 374, 385, 386; 349/67, 68; 362/8, 18, 29, 30; H04N 5/222, 9/64

[56] References Cited

U.S. PATENT DOCUMENTS

| | | | |
|---|---|---|---|
| 4,560,264 | 12/1985 | Kitazawa et al. | 396/374 |
| 4,977,456 | 12/1990 | Furuya | 348/333 |
| 4,997,263 | 3/1991 | Cohen et al. | 350/345 |
| 5,121,232 | 6/1992 | Miyadera | 359/49 |
| 5,132,825 | 7/1992 | Miyadera | 359/85 |
| 5,161,025 | 11/1992 | Nakao | 358/224 |

*Primary Examiner*—Andrew Faile
*Assistant Examiner*—Ngoc-Yen Vu
*Attorney, Agent, or Firm*—Ronald P. Kananen

[57] ABSTRACT

A light condensing plate (13) is disposed on the side of a rear surface of an LCD (2). A light guiding plate (9) is disposed on the side of a rear surface of the light condensing plate (13). A back light (5) is disposed on the side of a rear surface of the light guiding plate (9). The light guiding plate (9) has a light diffusing surface (10) formed on its surface opposed to the light condensing plate (13) and a reflection surface (11) formed on its surface opposed to the back light (5). The light guiding plate (9) has a light condensing surface (12) formed on its upper end portion so as to be opposed to an external light admitting window (6) defined on a viewfinder barrel (1). A lid (8) for opening and closing the external light admitting window (6) is provided on the viewfinder barrel. (1)

16 Claims, 5 Drawing Sheets

BACKLIGHTING AND COLOR CONTROL ARRANGEMENT FOR LCD TYPE VIDEO CAMERA VIEWFINDER HAVING MULTIPLE BACKLIGHTING SOURCES

This application is a continuation of application Ser. No. 08/355,183 filed Dec. 8, 1994, now abandoned.

BACKGROUND

1. Field of the Invention

The present invention relates generally to a video camera. More specifically, the present invention relates to a video camera having an improved backlighting arrangement for a viewfinder thereof.

2. Background of the Invention

The viewfinder of a video camera is often provided with a back light disposed behind a liquid crystal panel of the color liquid crystal display apparatus. This back light applies light to a surface of the liquid crystal panel to illuminate an image displayed thereon. However, with this type of arrangement there is the problem that when the cameraman uses a video camera outdoors under strong sun light, since an amount of light from the back light is extremely small as compared with that of sun light, the cameraman perceives the image displayed on the surface of the liquid crystal panel as being extremely dark.

SUMMARY OF THE INVENTION

An object of the present invention is to provide a viewfinder arrangement for a video camera by which the cameraman can watch an image displayed on a liquid crystal panel which is not only bright but produces colors approximate to natural colors.

To achieve the above object, the video camera viewfinder arrangement according to the present invention comprises an optical image pickup system including a lens, a diaphragm and so on, a CCD (charge coupled device) image sensor for converting light of an image of an object (an image) incident through the optical image pickup system into an electric signal, a camera signal processing unit and a video signal processing unit for converting the electric signal into a video signal, liquid crystal plate driving means, and a liquid crystal plate as a display device driven by the liquid crystal plate driving means for displaying the video signal thereon. The viewfinder of the video camera according to the present invention further comprises a back light and an external light admitting window as light applying means for applying light to a rear surface of the liquid crystal plate, the light applying means being selectively used in response to an output based on detected intensity of ambient light.

According to the viewfinder arrangement of preferred embodiments of the present invention, the intensity of the ambient light is detected by detection of a signal indicating a state of the diaphragm of the optical image pickup system.

According to the viewfinder arrangement of the preferred embodiments of the present invention, the intensity of the ambient light is detected by detection of a white balance information signal of the video signal supplied from the CCD image sensor.

According to the viewfinder arrangement of the preferred embodiments of the present invention, there is provided a light guiding plate for guiding a light from the back light or the external light admitting window to the rear surface of the liquid crystal plate.

Since the video camera viewfinder arrangement according to the present invention comprises the back light and the external light admitting window as light applying means for applying the light to the rear surface of the liquid crystal plate and the two light applying means are selectively used in response to the output based on the detected intensity of the ambient light, there can be achieved an effect in which the cameraman can effectively watch a display screen of the liquid crystal plate with brightness in response to an ambient illuminance under any environmental conditions.

Since the light applied from the back light and the light transmitted through the external light admitting window are selectively used in response to the output based on the detected intensity of the ambient light, i.e., since the back light can selectively be turned on and off, an energy required for the back light can be saved and hence a battery can be used for a longer time.

According to the viewfinder of preferred embodiments of the present invention, color correction of the liquid crystal plate can be carried out automatically. Therefore, display on the liquid crystal plate can be carried out with color approximate to the natural color under any environment conditions.

DESCRIPTION OF THE PREFERRED EMBODIMENTS

A color viewfinder arrangement of a video camera according to embodiments of the present invention will hereinafter be described with reference to the drawings by way of example.

Figure 1:
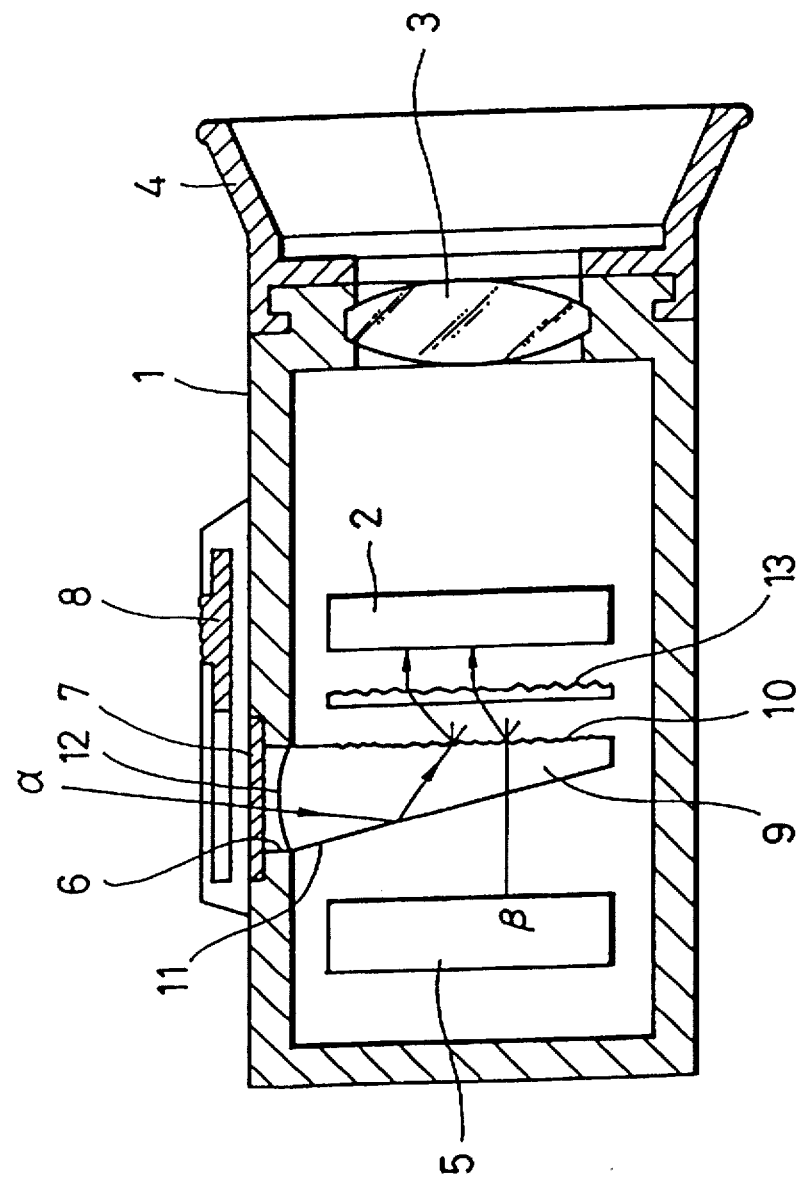
FIG. 1 is a schematic diagram showing a basic structure of a viewfinder according to an embodiment of the present invention.

FIG. 1 shows a basic arrangement of the color viewfinder of the present embodiments. In FIG. 1, reference numeral 1 depicts a viewfinder barrel. Reference numeral 2 depicts a liquid crystal plate (hereinafter referred to as an LCD) as a display device. Reference numeral 3 depicts an eyepiece disposed in front of a front surface of the LCD 2 (on an eyepiece portion 4 side). As shown in FIG. 1, a back light 5 for applying light to a rear surface of the LCD 2 is disposed at a certain distance or interval behind the LCD 2.

The viewfinder barrel 1 has an external light admitting window 6 formed through its upper portion above a portion between the LCD 2 and the back light 5. A color temperature conversion filter 7 is disposed in the external light admitting window 6. The external light admitting window 6 can be opened and closed using a lid 8 slidably provided in the viewfinder barrel 1.

A light guiding plate 9 is disposed between the LCD 2 and the back light 5. The light guiding plate 9 has a light diffusing surface 10 formed on its one surface opposed to the rear surface of the LCD 2, the light diffusing surface 10 being located in parallel to the rear surface of the LCD 2. The light guiding plate 9 has a reflection surface 11 formed on the other surface thereof opposed to a front surface of the back light 5, the reflection surface 11 being inclined relative to the diffusing surface 10. Moreover, the light guiding plate 9 has a convex light condensing surface 12 formed on its upper portion so as to be opposed to the external light admitting window 6. A light condensing plate 13 is disposed between the LCD 2 and the light guiding plate 9.

The light guiding plate 9 will be described in detail. The light diffusing surface 10 thereof is embossed (etched) or printed with a reflection pattern. When light is applied to the light diffusing surface 10, the light diffusing surface 10 can serve as a bright surface light source.

The reflection surface 11 reflects light incident through the light condensing surface 12 on the light guiding plate 9 to guide the incident light to the light diffusing surface 10 side. On the other hand, the reflection surface 11 transmits the light applied from the back light 5 therethrough to guide the transmitted light to the light diffusing surface 10 side.

According to the viewfinder of the present invention thus arranged, when the lid 8 is opened, external light can pass through the external light admitting window 6 on the inside of the viewfinder barrel 1 and impinge on the rear surface of the LCD 2 and, moreover, light applied from a light source of the back light 5 can also be applied to the rear surface of the LCD 2 in a fashion which is carried out in a known viewfinder.

Specifically, when external light α is incident through the external light admitting window 6 on the viewfinder barrel 1, the external light α is incident through the light condensing surface 12 of the light guiding plate 9 on the light guiding plate 9 and reflected by the reflection surface 11 thereof. The reflected light is guided to the light diffusing surface 10 which diffuses the same. The diffused light from the light diffusing surface 10 is collected by and transmitted through the light condensing plate 13, thereby being applied therefrom to the rear surface of the LCD 2.

On the other hand, light β applied from the back light 5 is transmitted straight through the reflection surface 11 of the light guiding plate 9 and guided in the light guiding plate 9 to the light diffusing surface 10 which diffuses the light β. The diffused light from the light diffusing surface 10 is collected by and transmitted through the light condensing plate 13, thereby being applied therefrom to the rear surface of the LCD 2.

As described above, the viewfinder according to the present invention has both means for applying the external light to the LCD 2 and known means for applying the light applied from the back light 5 to the LCD 2. Therefore, when the cameraman uses a video camera outdoors under strong sun light, for example, the external light admitted through the external light admitting window 6 is applied to the LCD 2, whereby the cameraman can view an image displayed on the LCD 2 with a brightness in response to ambient illuminance without perceiving the displayed image as being incongruous. When the cameraman uses the video camera under the condition that the ambient illuminance is not very bright, such as on a cloudy day or indoors, the external light admitting window 6 is manually closed with the lid 8 and only the light applied from the light source of the back light 5 is applied to the LCD 2, whereby the cameraman watches the image displayed on the LCD 2 with optimized brightness. As described above, according to the viewfinder of the present invention, the cameraman can effectively watch the display screen of the LCD 2 with brightness in response to ambient illuminance under any environmental conditions.

The external light and the light applied from the back light 5 differ in colour temperature (wavelength) from each other. Therefore, when the external light and the light applied from the back light 5 are used simultaneously the difference between color temperatures of the external light and the light applied from the back light 5 can be corrected to some degree by providing the color conversion filter 7 in the external light admitting window 6 in order to make color of the image displayed on the LCD 2 approximate to that of natural light.

Since the external light and the light applied from the back light 5 differ in colour temperature from each other as described above, it is necessary to correct the color of the displayed image in response to amounts of the external light and the light from the back light (i.e., to adjust white balance) in order to obtain a color approximate to the natural color under any shooting condition. It is convenient for saving energy that the amounts of the light from the back light and the external light are changed by detecting quantity of the external light.

Figure 2:
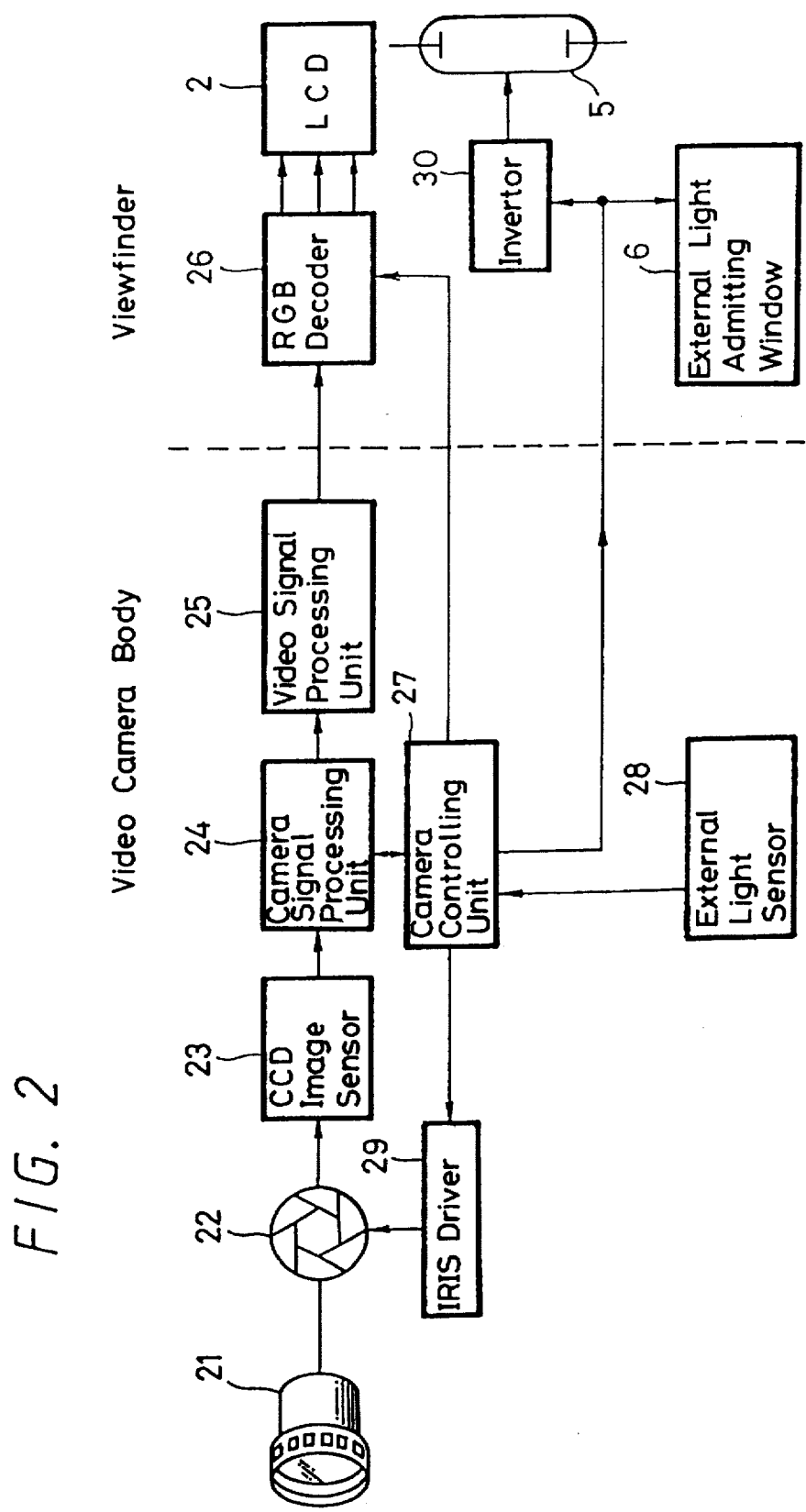
FIG. 2 is a block circuit diagram showing the viewfinder according to the embodiment of the present invention.

A control block circuit for automatically correcting the color of the displayed image and admitting the external light is shown in FIG. 2.

A light (an image) of an image of an object picked up by a lens unit 21 of a video camera body unit is converted through an iris (diaphragm) 22 into an electric signal by a CCD image sensor 23. The electric signal is processed by a camera signal processing unit 24 and a video signal processing unit 25. A color video signal adjusted in white balance is output from the video signal processing unit 25. The color video signal therefrom is corrected in color (adjusted in white balance) by an RGB decoder 26 and then displayed on the LCD 2 in the form of an image.

Information from the camera signal processing unit 24 is input to a camera controlling unit 27. The camera signal processing unit 24 is controlled in response to a signal output from the camera controlling unit 27. A signal from an external light sensor 28 for detecting intensity of ambient light is supplied to the camera controlling unit 27. In response to the signal, the camera controlling unit 27 drives an iris driver 29 to thereby adjust a diaphragm amount of the iris 22 in response to the intensity of the ambient light. In response to the signal from the external light sensor 28, the camera controlling unit 27 controls the color correction in the RGB decoder 26. Moreover, the camera controlling unit 27 can control the quantity of the light from the back light 5 through an invertor 30 and simultaneously control a closed or opened area of the external light admitting window 6.

Accordingly, when the external light is admitted automatically, under the control of the above-mentioned controlling block, white balance can be adjusted by the iris 22 and the RGB decoder 26 and the amount of the light from the back light 5 and the closed or opened area of the external light admitting window 6 can be adjusted on the basis of the information from the external light sensor 28 and so on.

When the color of the displayed image is corrected automatically, under the control of the above-mentioned controlling block, the color of the displayed imaged is corrected by the RGB decoder 26 in response to the closed or opened area of the external light admitting window 6 and the amount of the light from the back light 5 to thereby optimize the white balance of the image displayed on the LCD 2.

In some cases, such as when the external light is admitted indoors, it is sometimes observed that even though the color of the displayed image is corrected in response to the amounts of the external light and the light from the back light 5, the color of the image displayed on the LCD 2 is different from an original color of an object. In this case, if the external light admitting window 6 is closed with the lid 8 to block the external light similarly to that of the known viewfinder, then the color of the displayed image becomes approximate to the original color of the object.

If the color of the displayed image is set depending on an external light admitting mode operated when the lid 8 is opened and a back light mode operated when the lid 8 is closed, then it is possible to correct the color of the displayed image with only two-step adjustment to a certain degree, if not perfectly.

It is possible to provide a change-over switch for two modes operated in a ganged relation to sliding movement of the lid 8 and to provide a switch for turning the back light on and off operated in a ganged relation to the lid 8. In these cases, it is not necessary to provide the color temperature conversion filter 7.

The viewfinder according to the present invention is not limited to the above-mentioned embodiment. Various modified embodiments of the present invention can be made. Some of the modified embodiments will hereinafter be described with reference to FIGS. 3 through 7. In each of the modified embodiments, like elements and parts corresponding to those shown in FIG. 1 are marked with the same reference numerals and therefore need not be described repeatedly.

Modified Embodiment 1

Figure 3:
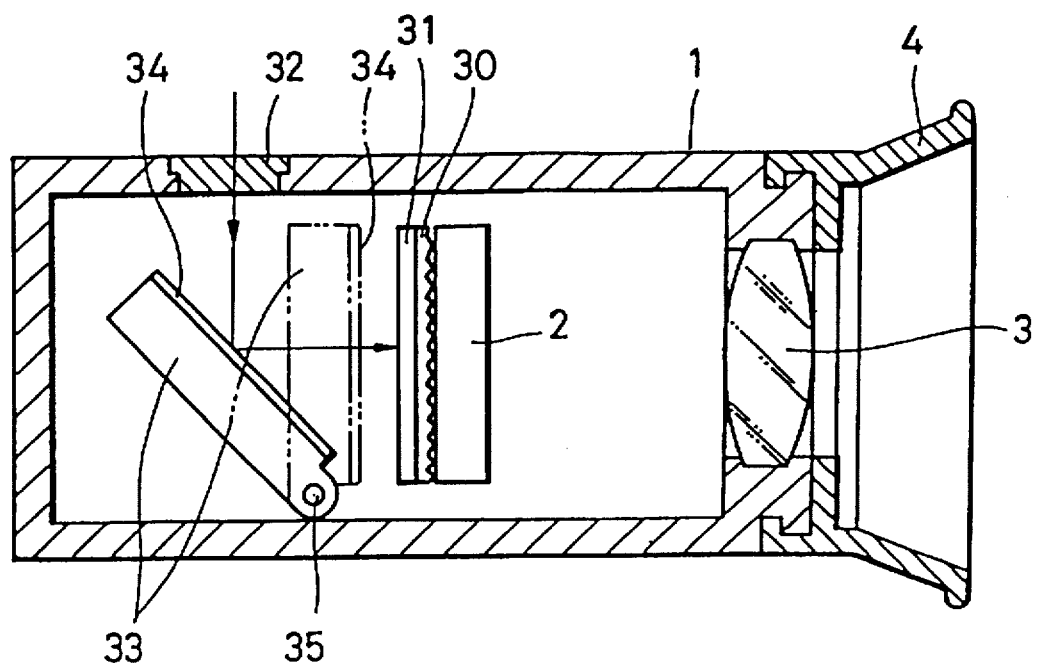
FIG. 3 is a schematic diagram showing a viewfinder according to a modified embodiment 1 of the present invention.

As shown in FIG. 3, a light condensing plate 30 is overlappingly disposed on a rear surface of an LCD 2 and a light diffusing plate 31 is overlappingly disposed on a rear surface of the light condensing plate 30. A transparent (translucent) member 32 (or a condenser lens) is provided in an external light admitting window 6. At a position opposed to the external light admitting window 6, a back light 33 is disposed at a certain interval behind the light diffusing plate 31 and inclined at an angle of 45°, for example. The back light 33 has a reflection surface 34 formed on its front surface. The back light 33 has a fulcrum shaft 35 provided at its lower end portion and therefore can be upwardly rotated around the fulcrum shaft 35. The back light 33 may be rotated in a manual or electrically-operated fashion.

In the viewfinder of this embodiment thus arranged, when the external light is applied to the LCD 2, the back light 33 should be previously positioned at a position where it is inclined. Specifically, at this time, the external light transmitted through the transparent (translucent) member 32 of the external light admitting window 6 is reflected by the reflection plate 34 formed on the front surface of the back light 33 to be incident on the light diffusing plate 31. The incident light is diffused by the light diffusing plate 31. The diffused light is condensed by the light condensing plate 30, being applied therefrom to the rear surface of the LCD 2.

On the other hand, when the light from the light source of the back light 33 is applied to the LCD 2, the back light 33 is rotated so as to be located at a position where it is raised as shown by a phantom line in FIG. 3, whereby the light from the light source of the back light 33 can be transmitted through the reflection plate 34 and applied through the light diffusing plate 31 and the light condensing plate 30 to the LCD 2. At this time, the external light transmitted through the external light admitting window 6 is blocked by the rear surface of the back light 33 and therefore prevented from being incident on the LCD 2 side.

Modified Embodiment 2

Figure 4:
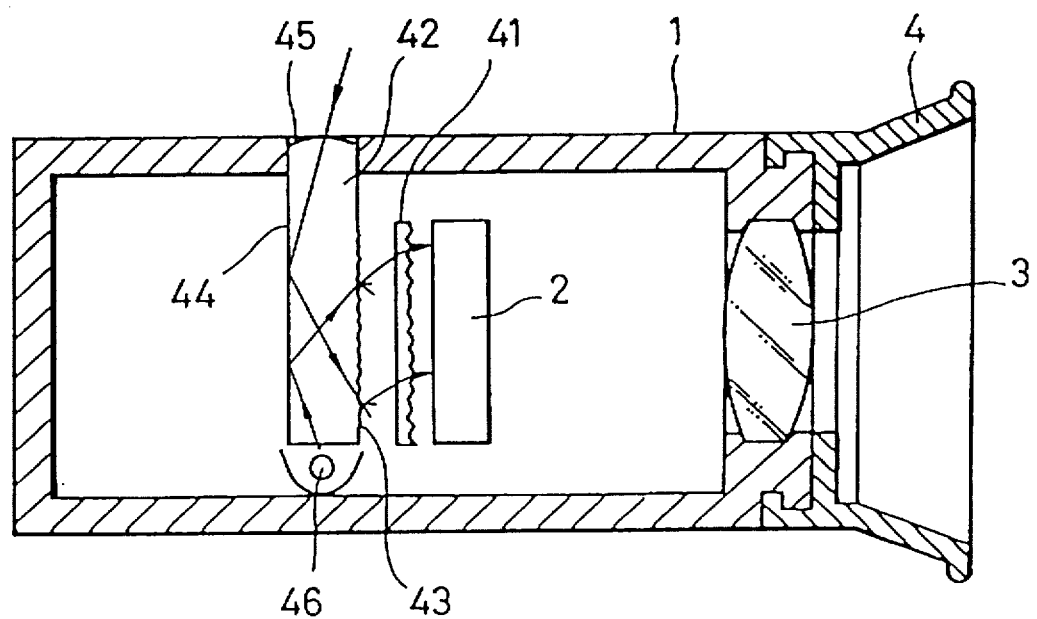
FIG. 4 is a schematic diagram showing a viewfinder according to a mod ed embodiment 2 of the present invention.

As shown in FIG. 4, a light condensing plate 41 is disposed behind an LCD 2 and a light guiding plate 42 is disposed behind the light condensing plate 41. The light guiding plate 42 has a light diffusing surface 43 formed on its front surface opposed to the light condensing plate 41 and a diffuse reflection surface 44 formed on the other or opposite surface thereof. The light guiding plate 42 has a light condensing surface 45 formed on its upper end surface so as to be exposed to the outside of a viewfinder barrel 1. A back light 46 is disposed below a lower surface of the light guiding plate 42.

According to a viewfinder of this embodiment thus arranged, when the external light is applied to the LCD 2, the external light incident through the light condensing surface 45 of the light guiding plate 42 is guided within the light guiding plate 42 and reflected by the diffuse reflection surface 44 thereof. The reflected light is diffused by the light diffusing surface 43. The diffused light from the light diffusing surface 43 is condensed by the light condensing plate 41, being applied therefrom to the rear surface of the LCD 2.

On the other hand, when the light from the light source of the back light 46 is applied to the LCD 2, the light from the light source of the back light 46 incident through the lower end surface of the light guiding plate 42 on the light guiding plate 42 is guided within the light guiding plate 42 and reflected by the diffuse reflection surface 44. The reflected light is diffused by the light diffusing surface 43. The diffused light from the light diffusing surface 43 is condensed by the light condensing plate 41, being applied therefrom to the rear surface of the LCD 2.

Modified Embodiment 3

Figure 5:
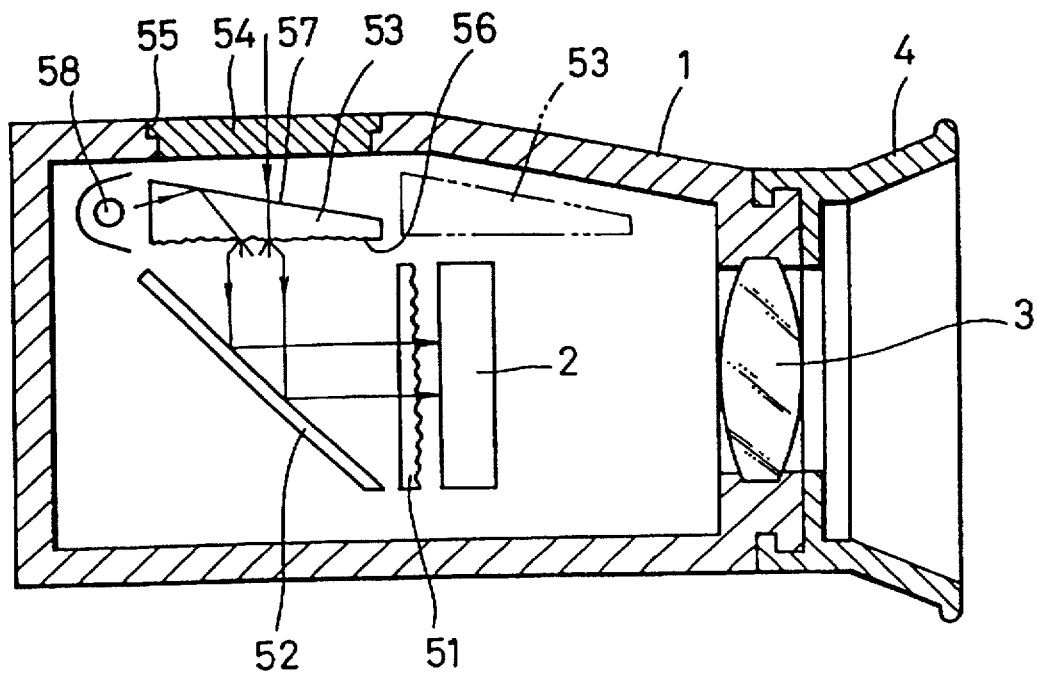
FIG. 5 is a schematic diagram showing a viewfinder according to a modified embodiment 3 of the present invention.

As shown in FIG. 5, a light condensing plate 51 is disposed behind an LCD 2 and a reflecting mirror 52 is provided behind the light condensing plate 51 with being inclined at an angle of 45°, for example. A light guiding plate 53 is disposed above the reflecting mirror 52. A viewfinder barrel 1 has an external light admitting window 55 defined at its portion above the light guiding plate 53, the external light admitting window 55 being provided with a transparent (translucent) member 54 (or a condenser lens). The light guiding plate 53 has a light diffusing surface 56 formed on its lower horizontal surface and a diffuse reflection surface 57 formed on its upper inclined surface. A back light 58 is disposed behind an end surface of the light guiding plate 53. The light guiding plate 53 can be horizontally moved to a portion where it is not opposed to the external light admitting window 55 in a manual or electrically-operated fashion.

According to a viewfinder of this embodiment thus arranged, when the external light is applied to the LCD 2, the external light transmitted through the transparent (translucent) member 54 of the external light admitting window 55 is transmitted straight through the diffuse reflection surface 57 formed on the upper inclined surface of the light guiding plate 53 and guided within the light guiding plate 53 to the light diffusing surface 56 formed on the lower surface thereof. The transmitted light is diffused by the light diffusing surface 56. The diffused light from the light diffusing surface 56 is reflected at a right angle by the reflecting mirror 52. The reflected light is condensed by the light condensing plate 51, being applied therefrom to the LCD 2.

On the other hand, when the light from the light source of the back light 58 is applied to the LCD 2, the light from the light source of the back light 58 incident through the end surface of the light guiding plate 53 on the light guiding plate 53 is guided within the light guiding plate 53 to the diffuse reflection surface 57 thereof which reflects the same. The reflected light is guided within the light guiding plate 53 to the light diffusing surface 56 thereof and diffused by the light diffusing surface 56. The diffused light from the light diffusing surface 56 is reflected at a right angle by the reflecting mirror 52. The reflected light is condensed by the light condensing plate 51, being applied therefrom to the LCD 2. When the light guiding plate 53 is moved to the portion where it is not opposed to the external light admitting window 55, the external light transmitted through the transparent (translucent) member 54 can be directly reflected by the reflecting mirror 52 and applied through the light condensing plate 51 to the LCD 2. Therefore, more external light can be admitted to the viewfinder barrel 1 to make an image displayed on the LCD 2 brighter.

Modified Embodiment 4

Figure 6:
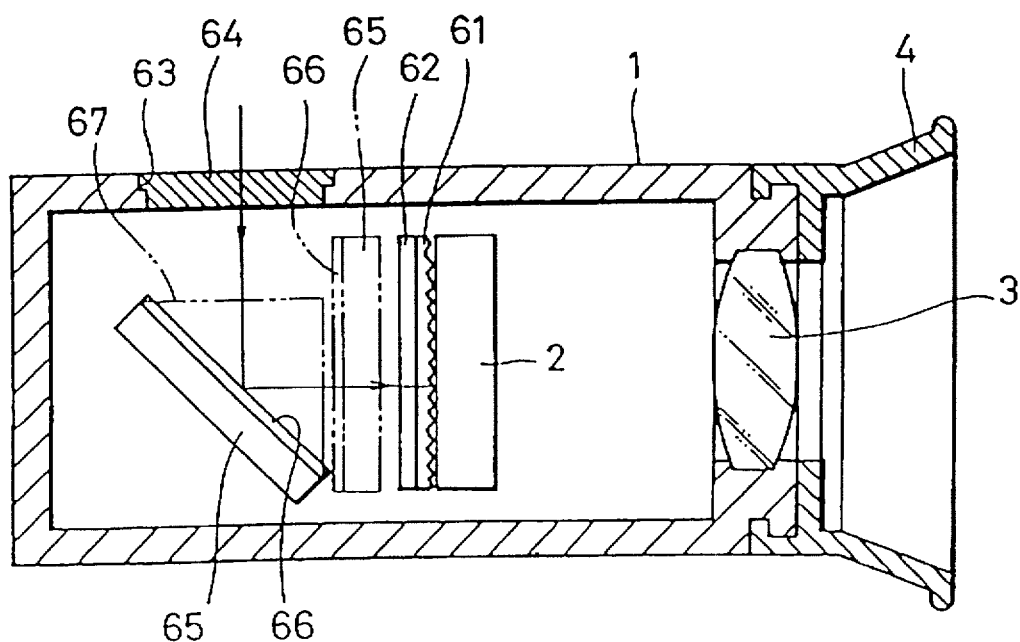
FIG. 6 is a schematic diagram showing a viewfinder according to a modified embodiment 4 of the present invention.

As shown in FIG. 6, a light condensing plate 61 is overlappingly disposed on a rear surface of an LCD 2 and a light diffusing plate 62 is overlappingly disposed on a rear surface of the light condensing plate 61. A transparent (translucent) member 64 (or a condenser lens) is provided in an external light admitting window 63. At a position opposed to the external light admitting window 63, a back light 65 is disposed at a certain interval behind the light diffusing plate 62 with being inclined at an angle of 45°, for example. The back light 65 has a reflecting mirror 66 provided on its front surface. The back light 65 can be raised and rotated so as to be located near the light diffusing plate 62 with its reflecting mirror 66 located on the opposite side of the light diffusing plate 62. Means for rotating the back light 65 may be operated manually or electrically.

According to a viewfinder of this embodiment thus arranged, when the external light is applied to the LCD 2, the back light 65 should be previously located at a position where it is inclined. The external light transmitted through the transparent (translucent) member 64 of the external light admitting window 63 is reflected by the reflecting mirror 66 provided on the front surface of the back light 65 and made incident on the light diffusing plate 62. The incident light is diffused by the light diffusing plate 62. The diffused light is condensed by the light condensing plate 61, being applied therefrom to the rear surface of the LCD 2.

On the other hand, when the light from the light source of the back light 65 is applied to the LCD 2, initially the back light 65 is rotated to a position shown by a phantom line in FIG. 6. Then, the light from the light source of the back light 65 is applied through the light diffusing plate 62 and the light condensing plate 61 to the LCD 2. In this case, even though the external light is incident through the external light admitting window 63 on the viewfinder barrel 1, the external light is reflected and blocked by the reflecting mirror 66 of the back light 65 and therefore prevented from being incident on the LCD 2 side.

Instead of providing the reflecting mirror 66, a prism 67 may be provided on the back light 65 as shown by a phantom line to apply the external light reflected by the prism 67 to the LCD 2.

Modified Embodiment 5

Figure 7:
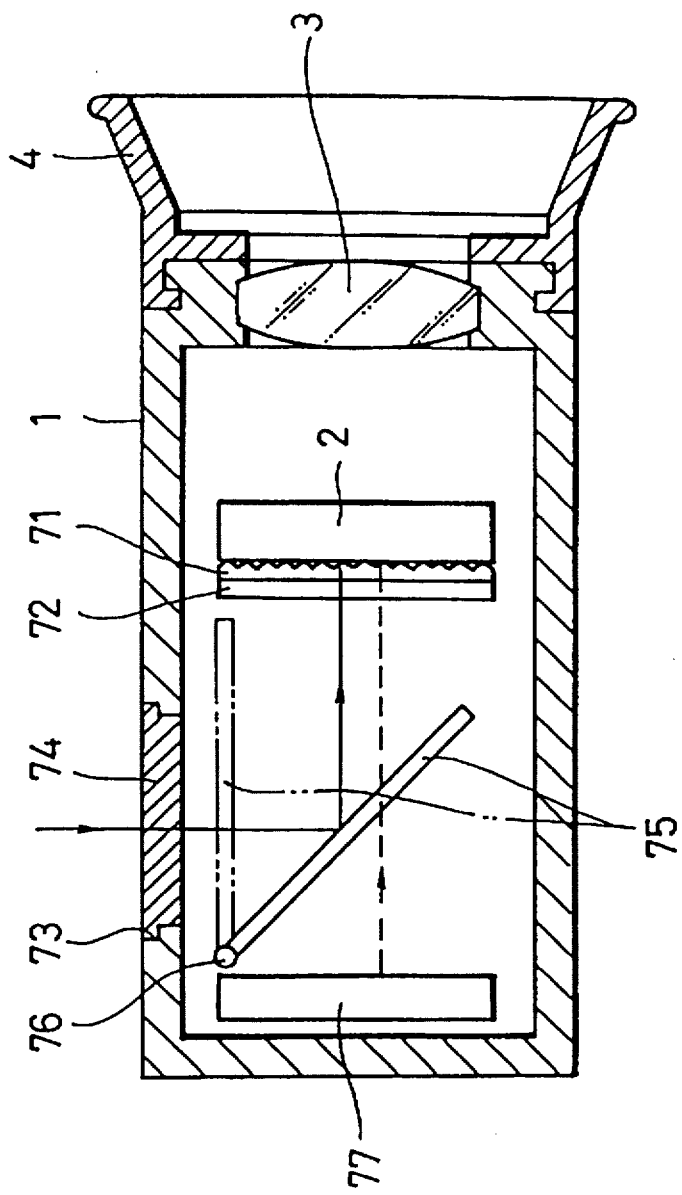
FIG. 7 is a schematic diagram showing a viewfinder according to a modified embodiment 5 of the present invention.

A shown in FIG. 7, a light condensing plate 71 is overlappingly disposed on a rear surface of an LCD 2 and a light diffusing plate 72 is overlappingly disposed on a rear surface of the light condensing plate 71. A transparent (translucent) member 74 (or a condenser lens) is provided in an external light admitting window 73. At a position opposed to the external light admitting window 73, a reflecting mirror 75 is disposed at a certain interval behind the light diffusing plate 72 with being inclined at an angle of 45°, for example. The reflecting mirror 75 has a fulcrum shaft 76 provided at its upper one end portion and therefore can be rotated upward around the fulcrum shaft 76 serving as a rotation fulcrum. A back light 77 is disposed at a rear portion of the reflecting mirror 75.

According to a viewfinder of this embodiment thus arranged, when the external light is applied to the LCD 2, the external light transmitted through the transparent (translucent) member 74 of the external light admitting window 73 is reflected at a right angle by the reflecting mirror 75 and made incident on the light diffusing plate 72. The incident light is diffused by the light diffusing plate 72. The diffused light is condensed by the light condensing plate 71, being applied therefrom to the LCD 2.

On the other hand, when the light from the light source of the back light 77 is applied to the LCD 2, the reflecting mirror 75 should be rotated upward as shown by a phantom line in FIG. 7. Then, the light from the light source of the back light 77 is applied through the light diffusing plate 72 and the light condensing plate 71 to the LCD 2. At this time, the external light transmitted through the external light admitting window 73 is reflected and blocked by the reflecting mirror 75 and therefore prevented from being incident on the LCD 2 side.

While each of the viewfinder according to the above modified embodiments has the lid for opening and closing the external light admitting window, the lid is not always necessary.

If the transparent (translucent) member or the condenser lens is provided in the external light admitting window, then it is necessary to provide the light diffusing surface or the light diffusing plate at the middle of a path of the incident light. If the light diffusing plate is provided in the external light admitting window, then it is not necessary to provide the light diffusing surface or the light diffusing plate at the middle of the path of the incident light.

It is needless to say that the cameraman can watch the image displayed on the LCD with optimized brightness by selectively using the external light transmitted through the external light admitting window and the light from the back light in response to intensity of ambient light in each of the modified embodiments similarly to the embodiment shown in FIG. 1.

While the external light admitting window is defined at the upper portion of the viewfinder barrel 1 in each of the above-mentioned embodiments, it may be defined at a side surface of the viewfinder barrel 1.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A video camera comprising:
   a lens for condensing light from an object;
   an image sensor for converting light from said lens into an electric signal;
   a signal processing circuit for converting the electric signal output from said image sensor into a predetermined video signal;
   a liquid crystal display unit for displaying the video signal output from said signal processing unit;
   first and second backlighting means for applying light to a rear surface of said liquid crystal display unit and for illuminating an image produced by said liquid crystal display unit in response to the video signal, said first backlighting means including a selectively energizable backlight which is pivotally mounted and which has a reflection surface formed on a front surface thereof, said backlight being movable between:
- (a) an inclined position wherein the backlight is de-energized and is oriented with respect to said second backlighting means in a manner that light from said second backlighting means is reflected off the reflection surface against the rear surface of said liquid crystal display, and
- (b) an upright position wherein the backlight is energized, and oriented with respect to said second backlighting means in a manner that light from said second backlighting means is blocked, and light from the selectively energizable backlight is directed against the rear surface of said liquid crystal display;

detecting circuit means for detecting external light intensity;

means for adjusting the video signal in white light balance to compensate for a difference in color temperature between light from said first backlighting means and light from said second backlighting means; and controlling means for controlling the position of said first backlighting means on the basis of detections by said detecting circuit.

2. A video camera according to claim 1, further comprising diaphragm means for adjusting an amount of said light transmitted between said lens and said image sensor and wherein said detecting means also detects a state of said diaphragm means.

3. A video camera according to claim 1, wherein said detecting means detects a state of said white balance adjusting means.

4. A video camera according to claim 1, further comprising diaphragm means for adjusting an amount of light transmitted between said lens and said image sensor; and wherein said detecting means also detects operative states of said diaphragm means and said white balance adjusting means.

5. A video camera according to claim 1, wherein said first backlighting means comprises a source of artificial light and said second backlighting means comprises a source of natural light.

6. A video camera according to claim 5, wherein said second backlighting means includes a light guiding plate which guides natural light toward said liquid crystal display.

7. A video camera according to claim 6, wherein a light diffusing plate is provided on one side surface of said light guiding plate.

8. A video camera according to claim 7, wherein at least one of said first and second backlighting means is movably mounted and selectively movable so as not to block an applied light.

9. A video camera according to claim 8, further comprising diaphragm means for adjusting an amount of said light transmitted to said image sensor and wherein said detecting circuit also detects a light adjusting state of said diaphragm means.

10. A video camera according to claim 9, wherein said detecting circuit also detects an operative state of said adjusting means.

11. A video camera according to claim 1, further comprising diaphragm means for adjusting a transmission amount of light to said image sensor, said detecting means also detecting operative states of said diaphragm means and said white balance means.

12. A video camera according to claim 11, wherein said first backlighting means comprises a source of artificial light and said second backlighting means comprises a source of ambient light.

13. A video camera according to claim 12, wherein said second backlighting means includes a light guiding plate.

14. A video camera according to claim 13, further comprising a diffusing plate for diffusing a light said diffusing plate being provided on one surface of said light guiding plate.

15. A video camera according to claim 1, wherein light from the backlight is directed against the rear surface of said liquid crystal display after being transmitted through the reflection surface.

16. A video camera according to claim 1, wherein the backlight is rotated as it moved from said inclined position to said upright position so that the reflection surface is positioned on the opposite side of the backlight with respect to said liquid crystal display so that light from said second backlighting means is reflected and blocked by the reflection surface.

* * * * *